United States Patent [19]
Meynier

[11] Patent Number: 4,475,337
[45] Date of Patent: Oct. 9, 1984

[54] RAPID-ASSEMBLY BRAKING CONTROL UNIT

[75] Inventor: Guy Meynier, Bondy, France
[73] Assignee: Societe Anonyme DBA, Paris, France
[21] Appl. No.: 400,498
[22] Filed: Jul. 21, 1982
[30] Foreign Application Priority Data
 Sep. 16, 1981 [FR] France ................. 81 17479
[51] Int. Cl.³ ........................... B60T 13/46
[52] U.S. Cl. ....................... 60/547.1; 92/128; 92/169
[58] Field of Search ........... 60/547.1, 547.2, 547.3; 92/128, 98 D, 169; 403/348, 349, 353

[56] References Cited

U.S. PATENT DOCUMENTS

| | | | |
|---|---|---|---|
| 3,200,914 | 8/1965 | Downs et al. | 60/547.1 |
| 3,232,644 | 1/1955 | Pfeifer et al. | 285/194 |
| 3,429,606 | 2/1969 | Brasseur | 403/348 |
| 4,281,895 | 8/1981 | Mohr | 403/348 |
| 4,283,993 | 8/1981 | Hayashida et al. | 92/98 D |
| 4,307,570 | 12/1981 | Yardley | 60/588 |

FOREIGN PATENT DOCUMENTS

| | | |
|---|---|---|
| 1555564 | 10/1970 | Fed. Rep. of Germany . |
| 2159320 | 10/1972 | Fed. Rep. of Germany . |
| 2444622 | 4/1975 | Fed. Rep. of Germany . |
| 2461200 | 7/1975 | Fed. Rep. of Germany . |
| 2728133 | 5/1979 | Fed. Rep. of Germany ...... 403/349 |
| 2381927 | 9/1978 | France . |
| 2058977 | 4/1981 | United Kingdom . |
| 2058260 | 4/1981 | United Kingdom . |

Primary Examiner—Abraham Hershkovitz
Assistant Examiner—Scott L. Moritz
Attorney, Agent, or Firm—Larry J. Palguta; Paul D. Schoenle; Ken C. Decker

[57] ABSTRACT

Quick assemblable master-cylinder and an assistance servo assembly. According to the invention, the master-cylinder (11) includes several lugs (12) while the end wall of the servo (14) is provided with a cut out (15a, 16a) similar in shape to the profile of a transverse section of the master-cylinder passing through said lugs.

6 Claims, 5 Drawing Figures

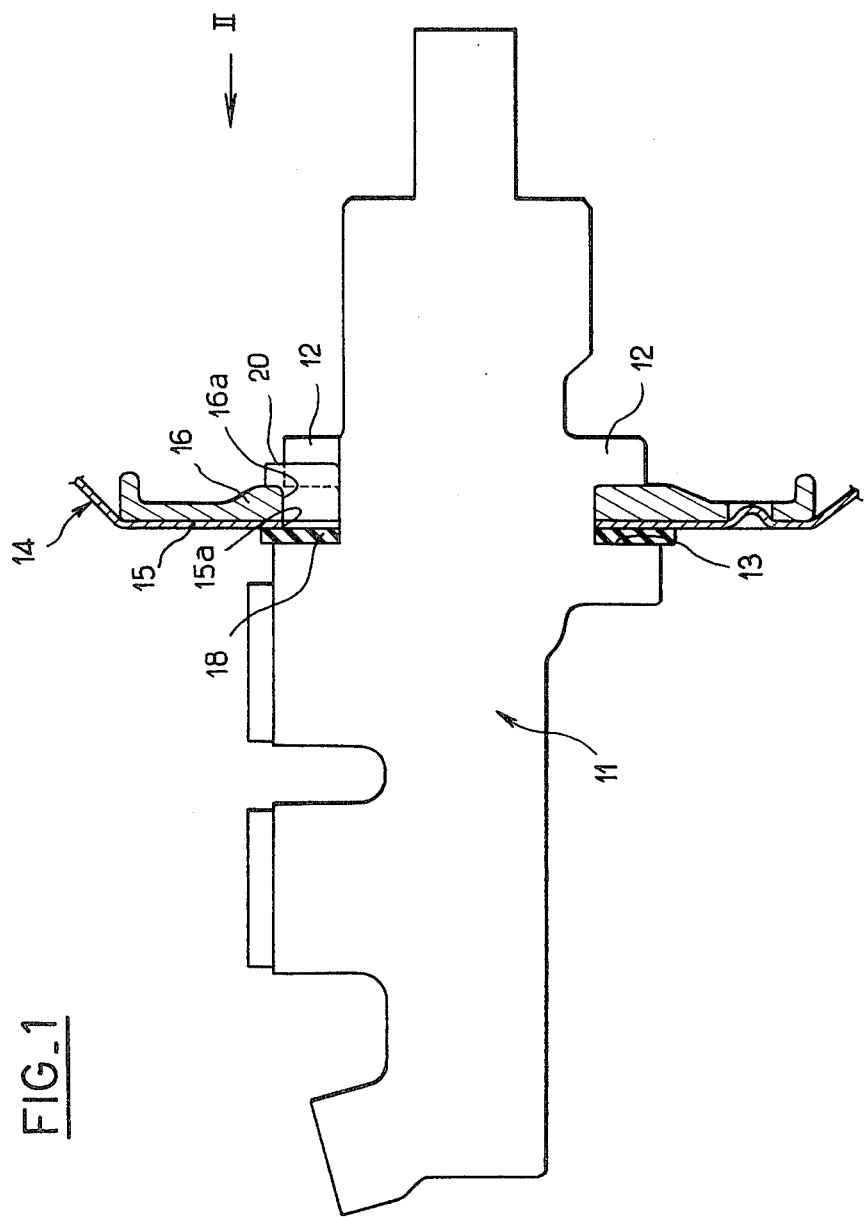

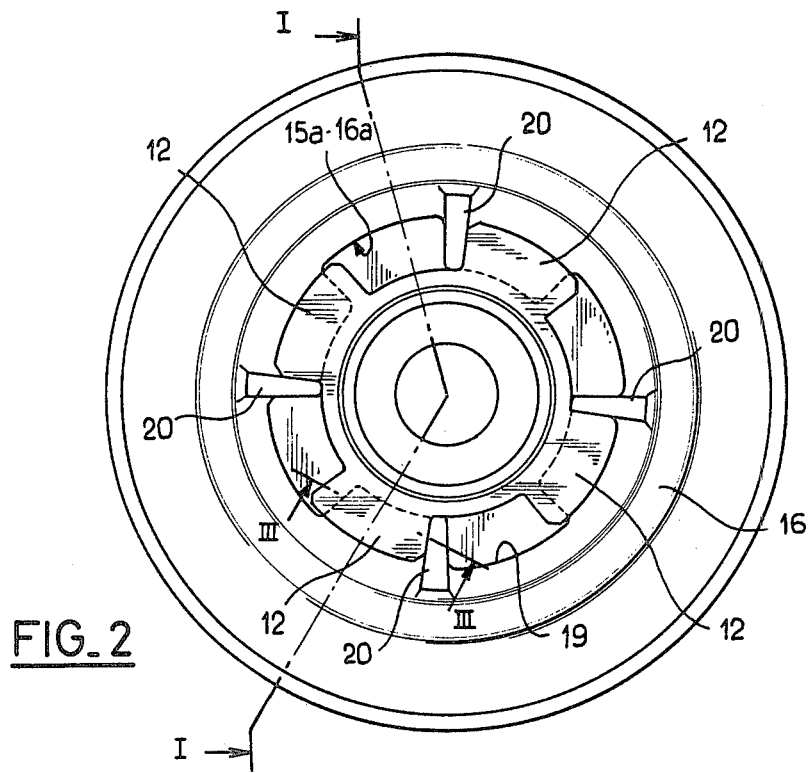
FIG_2
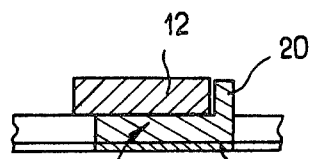
FIG_3
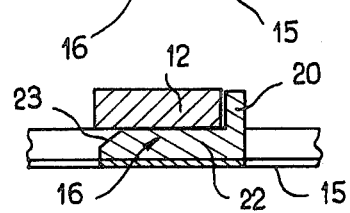
FIG_4
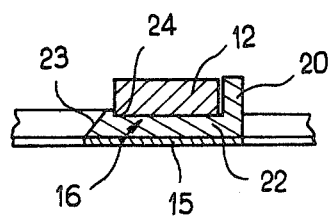
FIG_5

RAPID-ASSEMBLY BRAKING CONTROL UNIT

The invention essentially concerns a braking control unit, of the type comprising a master-cylinder and an assistance servo, provided with cooperating assembling means allowing rapid mounting as well as a simplification of the machining of said master-cylinder.

Fixing the master-cylinder to an end wall of the assistance servo, of the vacuum type, which is associated with it, is conventional. Hitherto, assembly was effected with a flange formed integrally with the body of the master-cylinder, trued over one of its faces and fixed to said end wall by means of four screws projecting therefrom.

The invention has as an object the omission of these screws, and to thereby achieve substantial time saving in the production line.

To achieve this, the invention provides for a brake control unit of the type comprising a master-cylinder fixed to an end wall of an assistance servo, characterized in that said master-cylinder includes several substantially coplanar lugs extending radially outwards and a shoulder substantially parallel to said lugs, in that said end wall includes a cut out substantially of the same shape as the profile of a transverse section of said master-cylinder passing through the lugs, and in that, in assembled condition, said shoulder and said lugs respectively bear on opposite sides of said end wall with a resilient means interposed therebetween, said lugs being engaged inside said servo and angularly offset with respect to notches in said cut out.

Said notches are of course dimensioned so as to allow passage of the lugs inside the case of the servo, the assembly being completed by simple rotation of the master-cylinder with respect to the servo, together with a compression of said resilient means which, when constituted by a seal member inserted between said shoulder and the outer surface of said end wall, ensures together with the assembled master-cylinder sealed closure of said cut out.

Other objects and advantages of the invention will become apparent from the following description of a brake control unit in conformance with the invention, given solely by way of example and with reference to the appended drawings, in which:

FIG. 1 schematically illustrates a master-cylinder in an external view, fixed to an end wall of an assistance servo partially represented along section line I—I of FIG. 2, in conformance with the principle of the invention;

FIG. 2 is a view along arrow II of FIG. 1;

FIG. 3 is a partial cross-section along line III—III of FIG. 2;

FIG. 4 is a view similar to FIG. 3 and shows an alternative embodiment; and

FIG. 5 is again a view similar to FIG. 3 and shows another alternative embodiment.

With reference to FIGS. 1 to 3, according to the invention, the master-cylinder 11 of the braking control unit includes four angularly spaced coplanar lugs 12, extending radially outwards, and a shoulder 13 parallel to the lugs 12 offset axially therefrom. This master-cylinder is fixed to an assistance servo 14, typically of the vacuum type, and more particularly to a plane central portion of an end wall 15 of the servo, a reinforcing plate member 16 being interposed between the inner face of said end wall 15 and the lugs 12. The end wall 15 and the reinforcing member 16 respectively include a central cut out 15a, 16a substantially similar in shape to the profile of a transverse section of the master-cylinder 11 passing through the lugs 12; this profile can be seen in particular in FIG. 2. A resilient means 18, constituted by an annular compressible seal, is inserted between the shoulder 13 and the outer surface of the end wall 15. Thus, after assembly, the shoulder 13 and the lugs 12 respectively bear on either side of the end wall 15, with the resilient means 18 interposed therebetween, as illustrated in FIG. 1; in mounting position the lugs 12 are engaged inside the servo and angularly offset with respect to notches 19 in the cut out 15a, 16a. Four positioning stops 20, integral with the casing of the servo 14 are disposed near the cut out. Each stop cooperates in abutment with a respective lug 12 to prevent any further rotation of the master-cylinder with respect to the servo in a predetermined direction of rotation, i.e. the direction of the rotation for assembling the components of the unit.

In the embodiment described, the stops 20 are borne by the reinforcing plate member 16.

Assembly of the master-cylinder and the servo is very simple and can be clearly understood from the preceding description. The master-cylinder, onto which is preferably arranged the seal 18, is presented in front of the cut out 15a, 16a in the servo so as to permit axial introduction of the lugs 12 inside the servo by causing them to pass through the notches 19. Then, while slightly compressing the seal 18 in exerting an axial compression force onto the master-cylinder, the master cylinder 11 is turned around its axial axis until the lugs 12 come into abutment with the corresponding stops 20.

According to the embodiment of FIG. 4, the inner portions 22 of the servo structure which are located circumferentially between the notches 19 each include a ramp-shaped part 23 located near the adjacent notch 19. When a reinforcing plate member 16 is provided, the ramp-shaped part 23 is of course formed at the inner surface of the reinforcing plate member. Alternatively, as shown in FIG. 5, said inner portions 22 can also each include a recess 24 in to which the corresponding lug 12 is lockingly received at the end of the assembling rotation.

I claim:

1. A braking control unit, comprising a master cylinder having an elongated body and an assistance servo booster operatively coupled to said master cylinder, said assistance servo booster including a casing having an end wall onto which said master cylinder is mounted by one mounting portion thereof, said mounting portion of said master cylinder being integral with said body and comprising a shoulder part and, axially offset therefrom, angularly spaced lugs having a radial extension less than the radial extension of said shoulder part and substantially coplanar mounting surfaces facing said shoulder part, said end wall of said assistance servo booster having an inner surface, a substantially flat outer surface and a contoured cutout with angularly spaced notches substantially similar in shape to the profile of a transverse section passing through a lug of said mounting portion of said master cylinder, and resilient sealing means on said mounting portion adjacent said shoulder part, whereby in assembled condition said shoulder part and lugs bear on opposite sides of said end wall with said resilient sealing means compressed between said shoulder part and said outer surface of said end wall after the lugs have been introduced into said assistance servo booster from outside through the notches of said cut-out and rotated to an angularly offset orientation relative to said notches, the lugs rotated until at least one of said lugs abuts a positioning stop formed in said inner surface of said end wall and disposed adjacent one of said notches, said end wall comprising an inner portion of a shell constituting part of said casing and a reinforcing plate member forming said inner surface of said end wall.

2. The unit according to claim 1, wherein said inner surface of said end wall includes ramp-shaped portions between said notches of said cut-out.

3. The unit according to claim 2, further comprising a recess within said inner surface forming with a ramp-shaped portion a non-return locking step.

4. A braking control unit of the type including a master cylinder having an elongated body and attached to an end wall of an assistance servo booster, comprising an assistance servo booster having a housing with an end wall for engagement with a mounting portion of a master cylinder, the mounting portion being integral with the body and comprising a shoulder axially spaced from a plurality of radially extending lugs with substantially coplanar mounting surfaces disposed opposite the shoulder, the booster having an end wall with inner and outer surfaces and a centrally disposed opening including angularly spaced-apart circumferential notches substantially similar in shape to the configuration of the lugs, resilient sealing means for biasing the end wall against the lugs and for effecting a substantially fluid-tight seal between the booster and master cylinder, the sealing means disposed on said mounting portion adjacent said shoulder, and stop means at the inner surface and disposed adjacent the notches, whereby the booster is attached to the master cylinder by the mounting portion engaging the end wall so that the shoulder and lugs bear on opposite surfaces of the end wall with the resilient means compressed between the outer surface and shoulder after the lugs have been inserted from outside through the notches and rotation has disposed the lugs in an angularly offset position relative to the notches, and including a reinforcing member disposed between the inner surface and the lugs, the member having a central opening for receiving said mounting portion and inner surface portions disposed circumferentially between the notches of the centrally disposed opening, the inner surface portions including ramp means for assisting in rotation of the lugs to said offset position whereby the coplanar mounting surfaces engage the inner surface portions.

5. The unit in accordance with claim 4, wherein the stop means engages the lugs to prevent further rotation.

6. The unit in accordance with claim 4, wherein said reinforcing member includes inner surface portions disposed circumferentially between the notches of the centrally disposed opening, the inner surface portions including axial recess means for receiving the lugs therein to lock the booster in engagement with the master cylinder.

* * * * *